(No Model.)

D. HALL.
CAN OPENER.

No. 562,822.  Patented June 30, 1896.

WITNESSES:
John Buckler,
E. Grist

INVENTOR
Daniel Hall,
BY Edgar Tate & Co
ATTORNEYS

UNITED STATES PATENT OFFICE.

DANIEL HALL, OF LOCUST VALLEY, NEW YORK.

CAN-OPENER.

SPECIFICATION forming part of Letters Patent No. 562,822, dated June 30, 1896.

Application filed December 24, 1895. Serial No. 573,220. (No model.)

*To all whom it may concern:*

Be it known that I, DANIEL HALL, a citizen of the United States, and a resident of Locust Valley, in the county of Queens and State of New York, have invented certain new and useful Improvements in Can-Openers, of which the following is a specification, reference being had to the accompanying drawings, forming a part thereof, in which similar letters of reference indicate corresponding parts.

This invention relates to can-openers, and the object thereof is to provide an improved device of this class which is simple in construction and effective in operation, while being also comparatively inexpensive.

The invention is fully disclosed in the following specification, of which the accompanying drawings form a part, in which—

Figure 1:
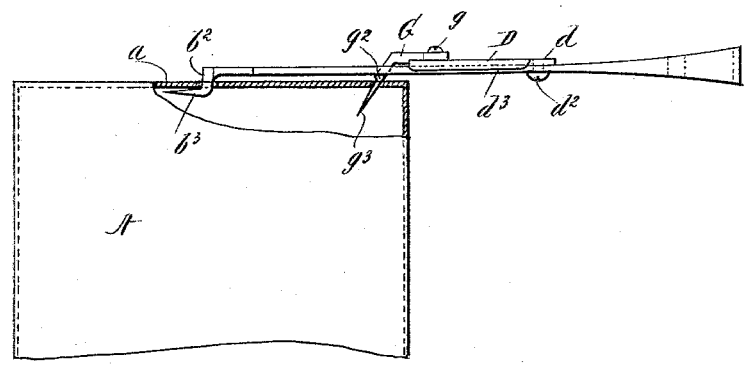
Figure 2:
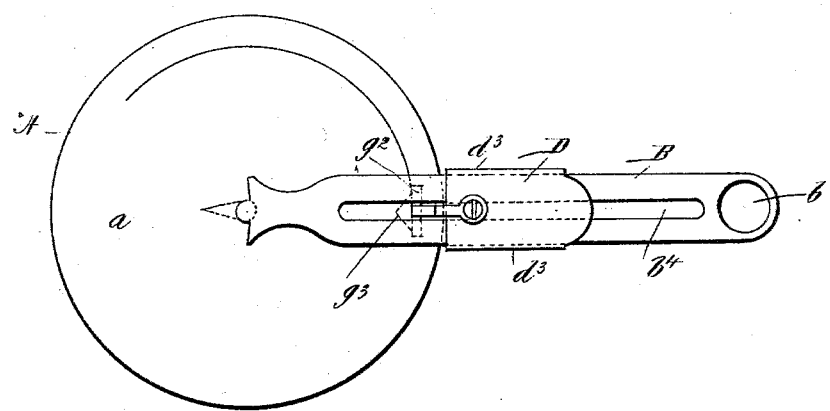

Figure 1 is a side view of a can or a portion thereof, showing the method of operating my improved can-opener; and Fig. 2, a plan view thereof.

In the drawings forming a part of this specification, A represents one end of an ordinary can, which is provided with a head $a$, and in the practice of my invention I provide a can-opener comprising a handle B, the outer end of which is provided with a circular opening $b$, and the opposite end is provided with a depending shank $b^2$, on the lower end of which is formed a point or prong $b^3$, which projects in the same direction as the handle, and preferably parallel therewith.

The handle B is provided with a longitudinal slot $b^4$, and mounted thereon is a sliding plate D, which is provided at its outer end with a pin or bolt $d$, which passes through said slot, and the lower end of which is riveted or provided with a nut, as shown at $d^2$, and the inner end of the sliding plate D is provided with an arm G, which is secured to the upper surface thereof by means of a screw or bolt $g$, and is bent at an angle and passes through the slot $b^4$, and to which is secured below said slot a cross-head $g^2$, and the lower end of said arm is provided with a blade $g^3$, which is pointed and provided with a cutting edge on each side.

It will be observed that the plate D is free to slide on the handle B, and is also prevented from lateral movement thereon by the screw or bolt $d$, and by depending flanges $d^3$ at each side thereof, which incloses the sides of the handle B, and the operation will be readily understood from the foregoing description, when taken in connection with the accompanying drawings. When it is desired to cut out the head of a can, the point or prong $b^3$ is inserted thereinto at or about the center thereof, and the sliding plate D is adjusted on the handle B, to correspond with the diameter of the can, and said handle is depressed, so that the blade $g^3$ is forced through the head of the can, in which operation the prong $b^3$ serves as a pivot for the handle, after which the device is turned around the can, as will be readily understood, and in a manner familiar to those accustomed to the use of devices of this class, and the entire head of the can may be quickly and easily removed. In the operation of turning the handle B around the head of the can, the shank $b^2$ serves as a pivot, and it will be readily understood that, by reason of the fact that the plate D is adjustable on the handle B, the device may be employed for cutting out the head of a can of almost any size, it being also apparent that the handle B may be made as long as desired.

My invention is not limited to the exact form, construction, and arrangement of the parts thereof, as herein described, and I therefore reserve the right to make all such alterations therein, and modifications thereof, as fairly come within the scope of the invention.

Having fully described my invention, I claim as new and desire to secure by Letters Patent—

An improved can-opener consisting of handle B, provided with a circular opening in its outer end, an integral depending pronged shank on the opposite end and a longitudinal slot in the body of said handle in which slot is fixed a sliding plate D, that is adjustably held in place by bolt and nut $d$, $d^2$, respectively, said plate D being provided with a removable and reversible arm G that is secured in place by pin or bolt $g$, and is provided with an integral cutting-blade $g^3$, that projects down through the slot in the handle B, and has fixed on it, below said handle, a cross-head $g^2$, all constructed and arranged as herein shown and described.

In testimony that I claim the foregoing as my invention I have signed my name, in presence of the subscribing witnesses, this 23d day of December, 1895.

DANIEL HALL.

Witnesses:
C. GERST,
L. M. MULLER.